(12) United States Patent
Fischer et al.

(10) Patent No.: US 7,484,796 B2
(45) Date of Patent: Feb. 3, 2009

(54) HEAD REST ARRANGEMENT FOR A MOTOR VEHICLE SEAT

(75) Inventors: Matthias Fischer, Kronach (DE); Jochen Hofmann, Marktgraitz (DE)

(73) Assignee: Brose Fahrzeugteile GmbH & Co. KG, Coburg, Coburg (DE)

( * ) Notice: Subject to any disclaimer, the term of this patent is extended or adjusted under 35 U.S.C. 154(b) by 119 days.

(21) Appl. No.: 10/549,985

(22) PCT Filed: Mar. 9, 2004

(86) PCT No.: PCT/DE2004/000495

§ 371 (c)(1),
(2), (4) Date: May 23, 2006

(87) PCT Pub. No.: WO2004/082985

PCT Pub. Date: Sep. 30, 2004

(65) Prior Publication Data

US 2006/0267384 A1    Nov. 30, 2006

(30) Foreign Application Priority Data

Mar. 20, 2003   (DE) ............................... 103 13 800

(51) Int. Cl.
*B60N 2/42* (2006.01)
*B60R 22/28* (2006.01)
(52) U.S. Cl. .................... 297/216.12; 297/408; 297/410
(58) Field of Classification Search ............ 297/216.12, 297/408, 410
See application file for complete search history.

(56) References Cited

U.S. PATENT DOCUMENTS 3,397,911 A    8/1968   Brosius, Sr.
5,288,129 A *  2/1994   Nemoto ..................... 297/410

(Continued)

FOREIGN PATENT DOCUMENTS

DE    102 15 054        10/2003
DE    102 15 054 A1     10/2003

OTHER PUBLICATIONS

English translation of IPER, dated Feb. 21, 2006, for International Application No. PCT/DE2004/000495, in the name of Brose Fahrzeugteile GmbH & Co. Coburg.

(Continued)

*Primary Examiner*—Sarah B McPartlin
(74) *Attorney, Agent, or Firm*—Christie, Parker & Hale, LLP.

(57) ABSTRACT

A head rest arrangement for a motor vehicle seat includes a back rest frame, a head rest which can be fixed in at least one position of use on the back rest frame and comprises a head rest body for supporting the head of a vehicle passenger, a device for displacing the head rest in the event of a collision, in order to be able to move the head rest body in relation to the back rest frame into a pre-determinable position different from the position of use, and a locking device which counteracts a displacement of the head rest and can be unlocked in a the event of a collision. The head rest arrangement is provided with a device for blocking the displacement device in an unlocked state as long as the head rest is moved out of the position of use.

38 Claims, 15 Drawing Sheets

U.S. PATENT DOCUMENTS

| | | | |
|---|---|---|---|
| 6,135,561 | A | 10/2000 | Kruger et al. |
| 6,199,947 | B1 | 3/2001 | Wiklund |
| 6,352,285 | B1 * | 3/2002 | Schulte et al. .............. 280/756 |
| 6,688,697 | B2 * | 2/2004 | Baumann et al. ............ 297/391 |
| 7,097,242 | B2 * | 8/2006 | Farquhar et al. ....... 297/216.12 |
| 2001/0040396 | A1 | 11/2001 | Kreuels et al. |
| 2003/0057758 | A1 | 3/2003 | Baumann et al. |

OTHER PUBLICATIONS

International Search Report, dated Sep. 1, 2004, corresponding to PCT/DE2004/00495.

* cited by examiner

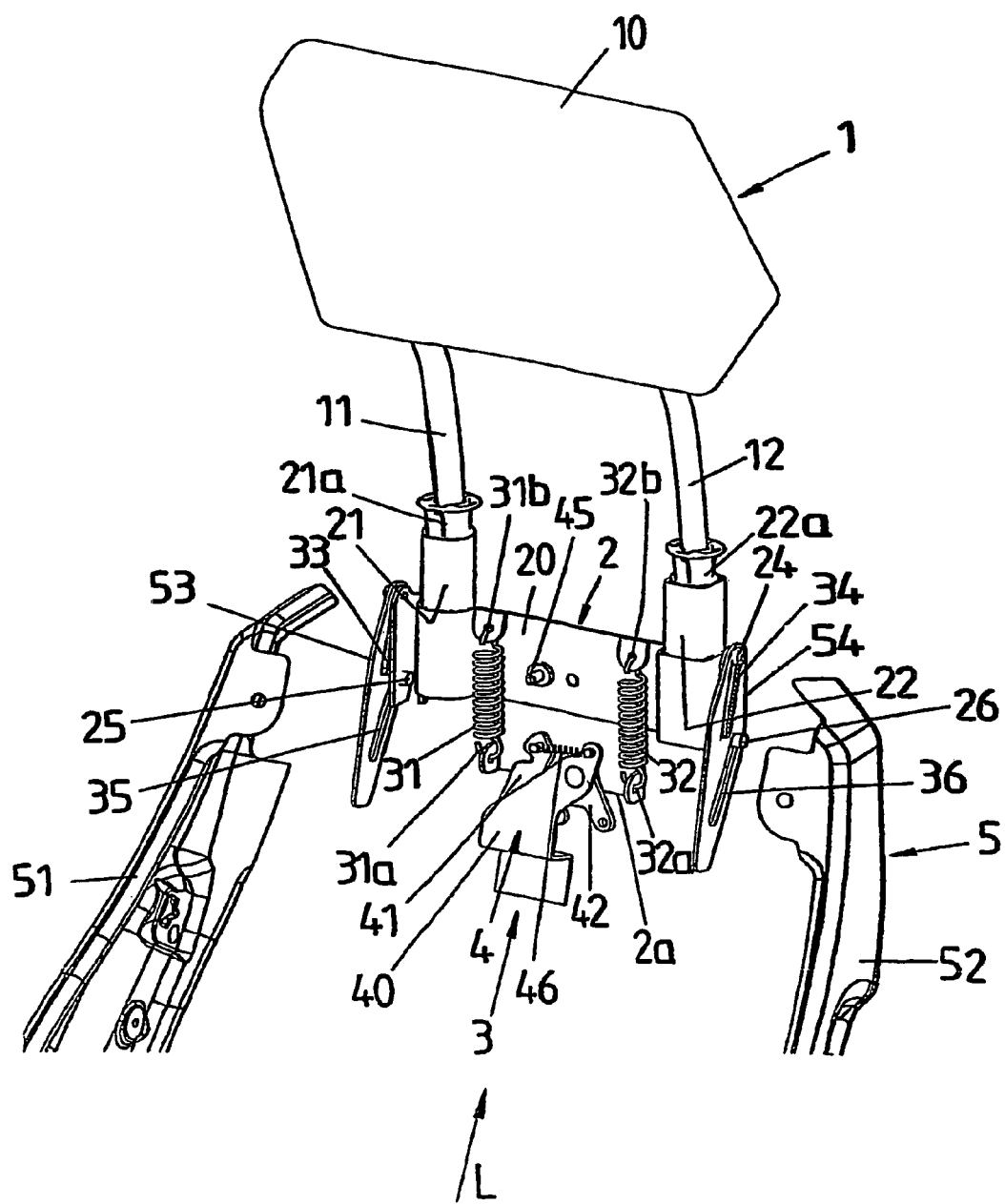

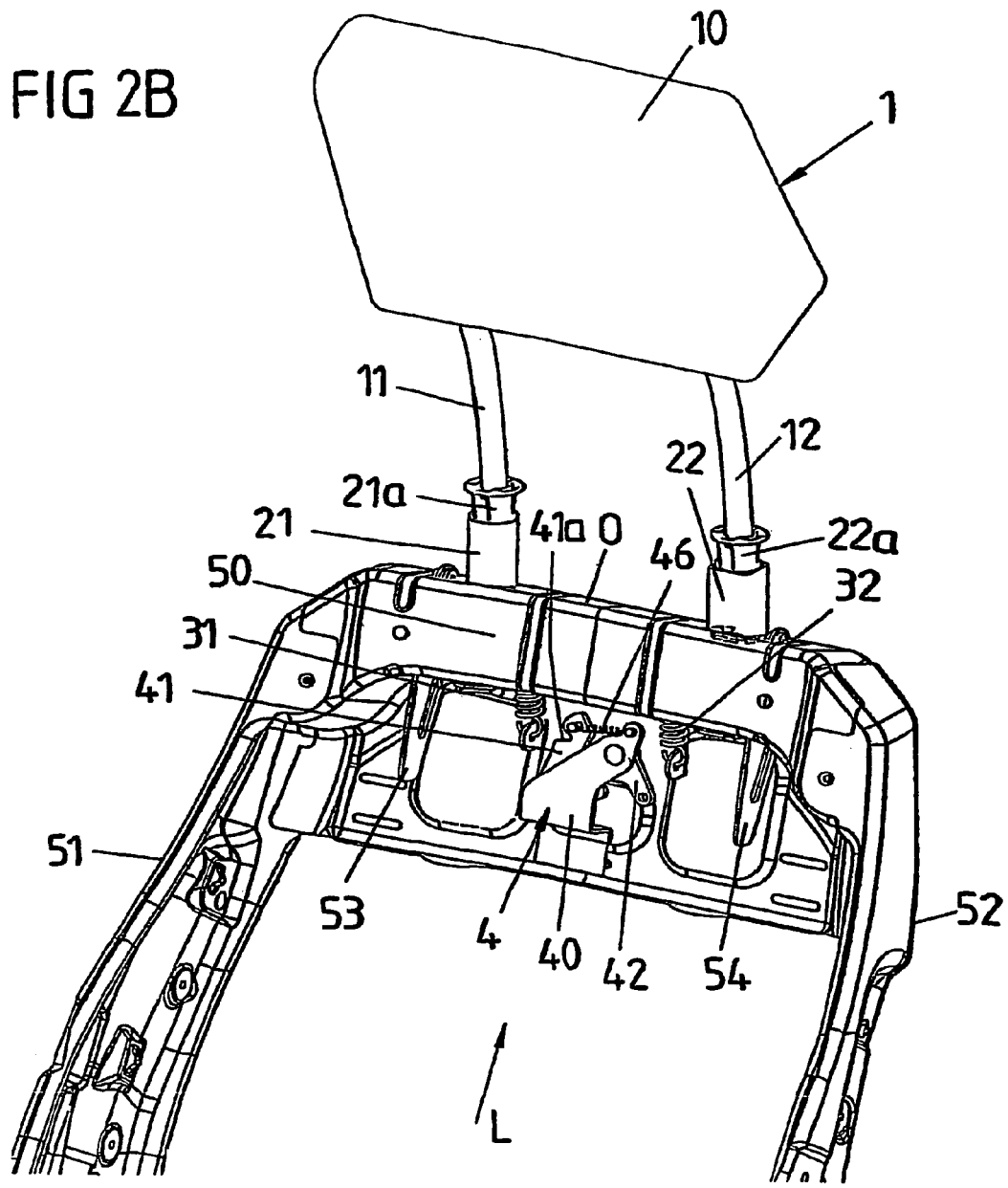

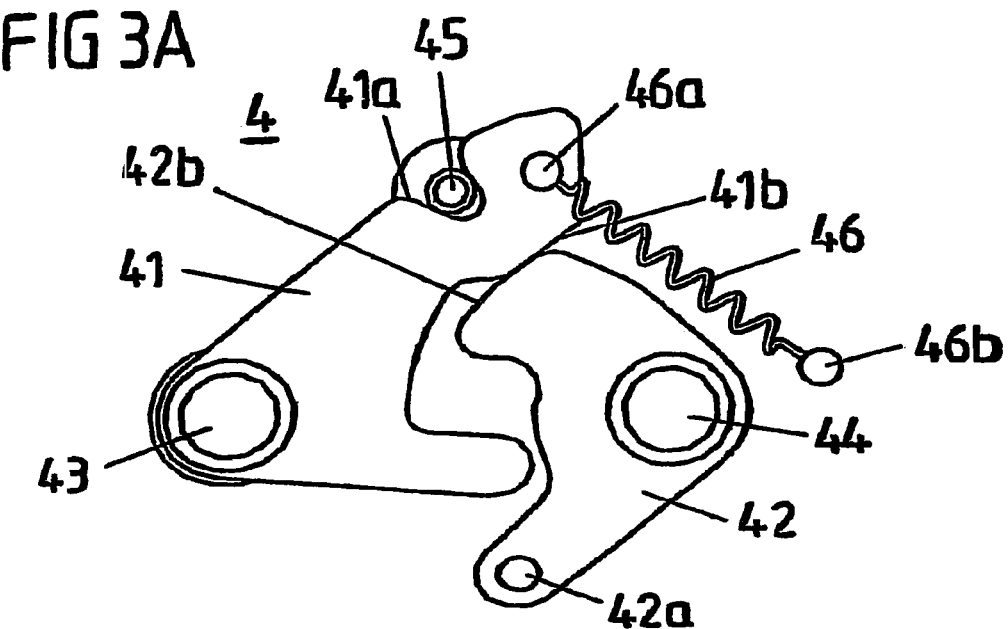
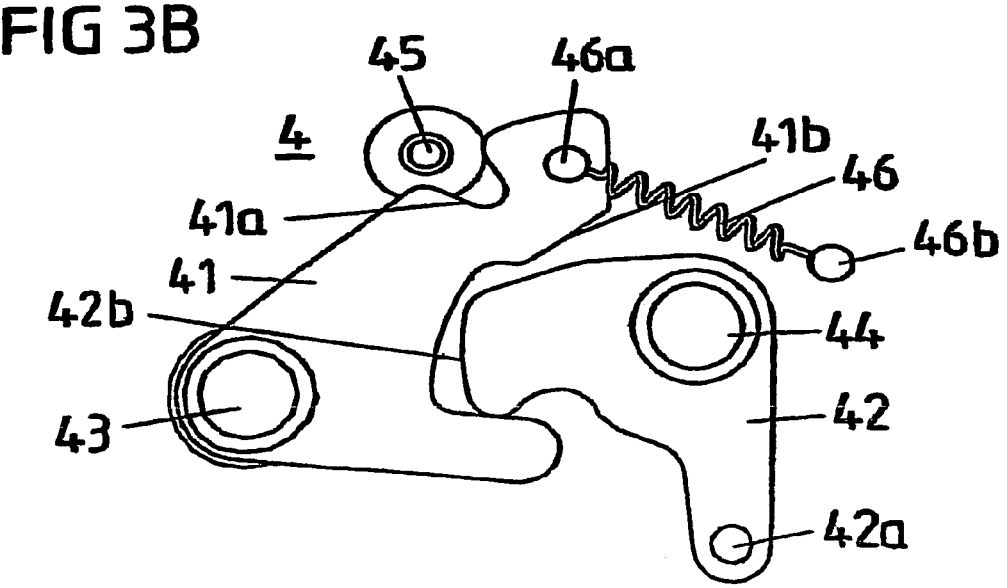

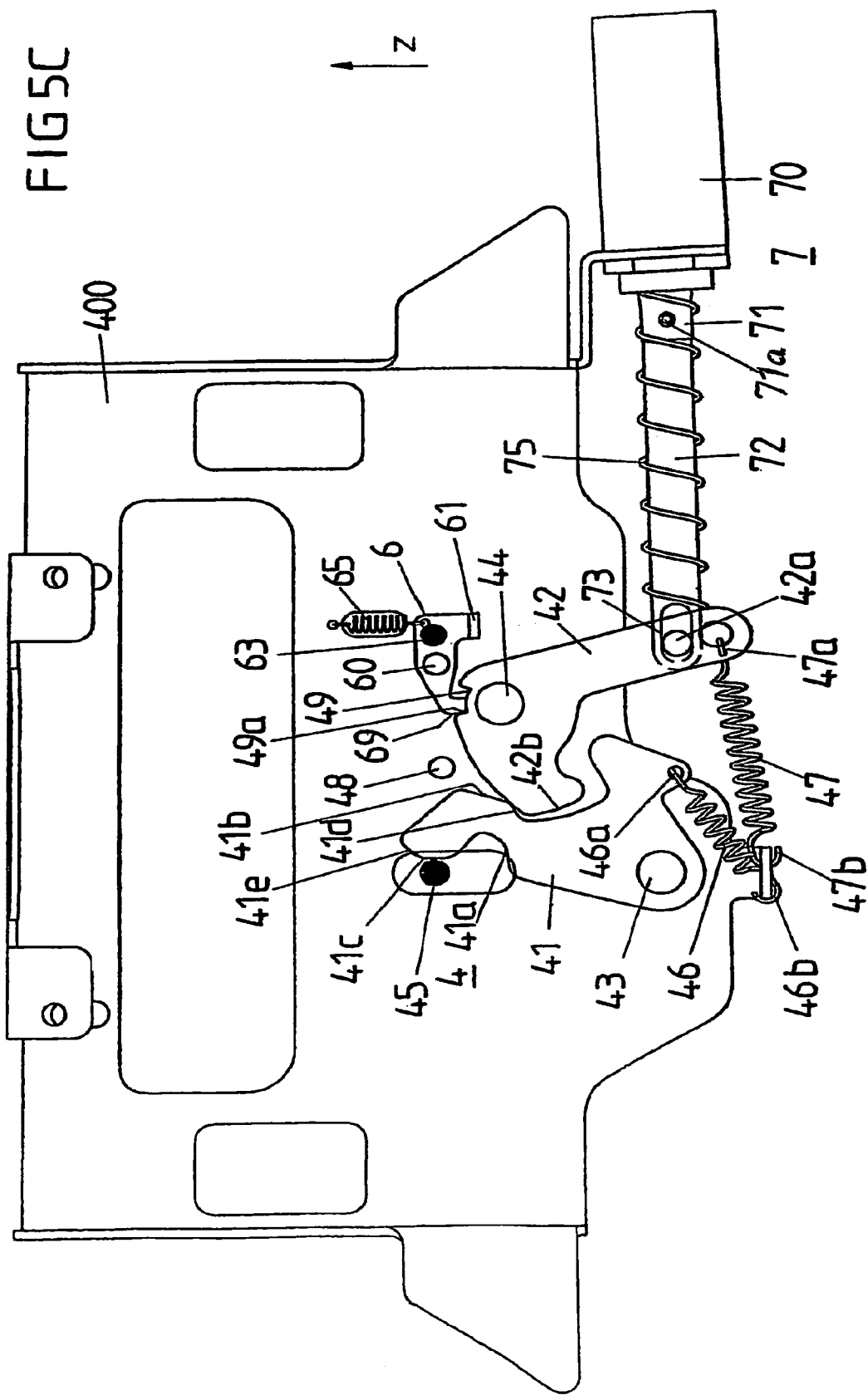

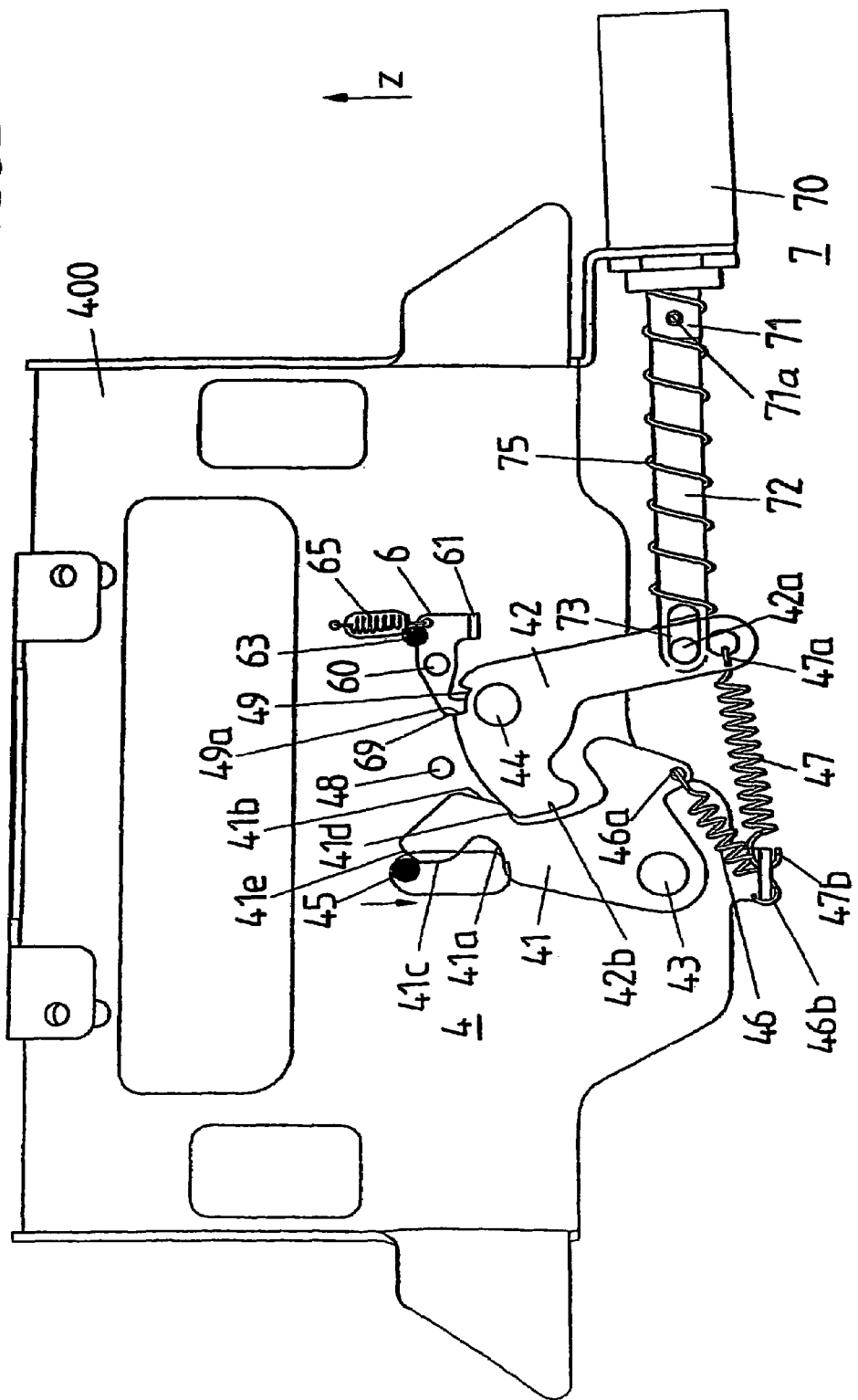

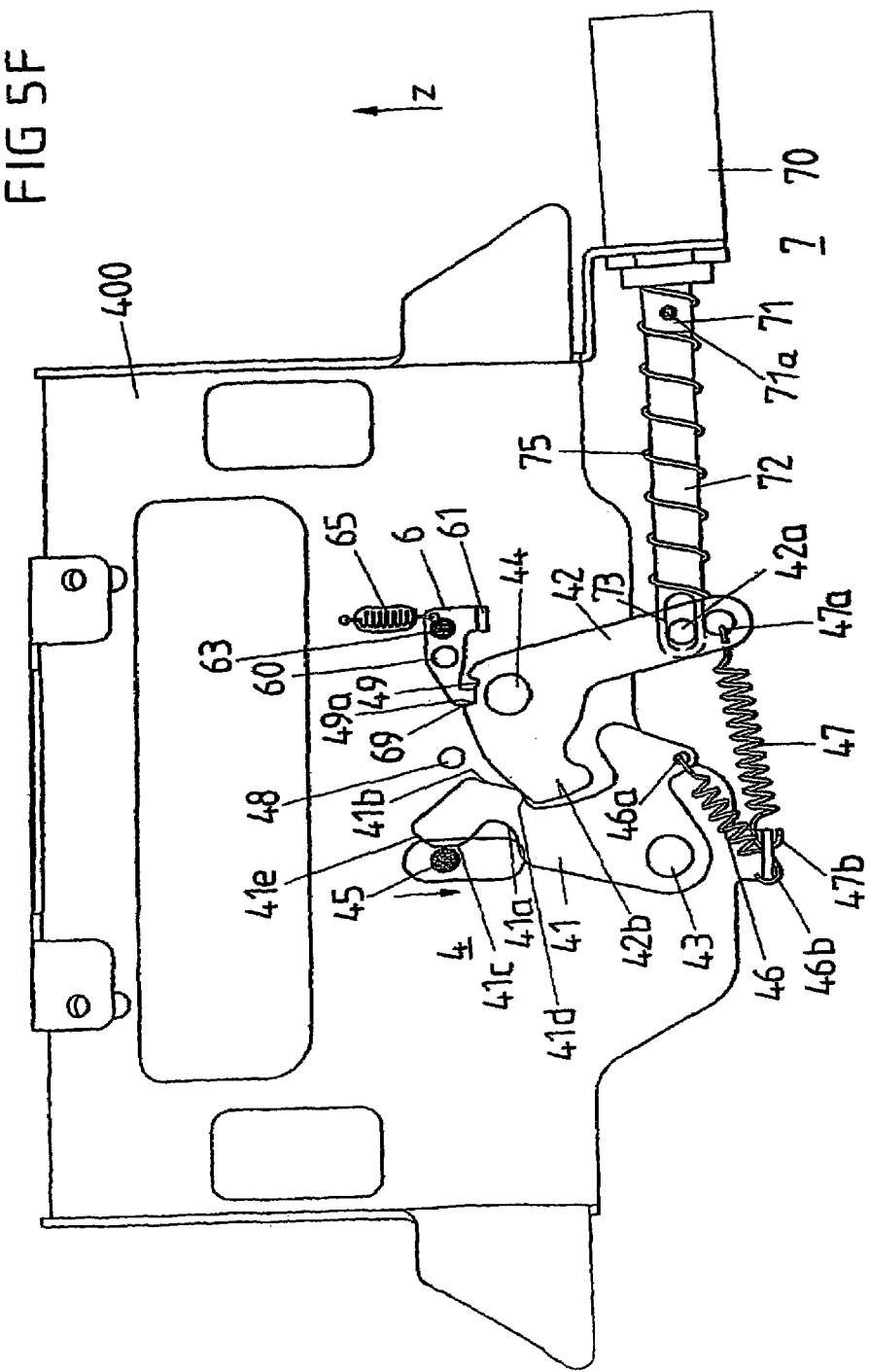

HEAD REST ARRANGEMENT FOR A MOTOR VEHICLE SEAT

CROSS-REFERENCE TO RELATED APPLICATION

This application is a National Phase Patent Application of International Application Number PCT/DE2004/000495, filed on Mar. 9, 2004, which claims priority of German Patent Application Number 103 13 800.5, filed on Mar. 20, 2003.

BACKGROUND

The invention relates to head rest arrangement for a motor vehicle seat.

A head rest arrangement of this kind comprises by way of example a backrest frame for a backrest of the motor vehicle seat which extends along a longitudinal direction of the backrest and serves to support the back of an occupant seated on the corresponding vehicle seat; an upper edge of the backrest frame which defines the backrest frame at the top in the upright function position; a head rest which can be fixed in at least one useful position above the upper edge of the backrest frame and whose head rest body has a front side provided for supporting the head of a vehicle occupant; a device for moving the head rest in the event of a crash in order to move the head rest body relative to the backrest frame upwards and/or forwards into a predeterminable position different from the useful position behind the head of a vehicle occupant and thus achieve an improved support of the head and neck area of the vehicle occupant in the event of a crash; as well as a locking device which counteracts displacement of the head rest and which can be unlocked in a crash situation.

By useful position of the head rest is meant a position which serves in normal operation of a motor vehicle to support the head of a vehicle occupant. With a head rest which can be adjusted in height relative to the top edge of the backrest such a useful position can be set for example by the occupant himself or alternatively can be set automatically through an occupant identification system which identifies a vehicle occupant from his weight, from a previously set seat longitudinal position or in some other way and then triggers the setting of a specific useful position of the head rest.

By crash situation is generally meant here a sudden occurrence of a (positive or negative) acceleration (more particularly a sharp vehicle deceleration) which goes beyond that which is to be expected during normal use of the vehicle in traffic. The threshold from which a displacement of the head rest from its function position is triggered conditioned by the crash is to be selected so that those actions on the vehicle and thus also on the vehicle occupants in which the head and neck region of the vehicle occupant can be exposed to particular stresses are detected. This can be determined through corresponding crash tests.

A displacement of the head rest from its useful position means thereby a change in the position of the head rest compared with the useful position into which the head rest had been previously brought for supporting the head of a vehicle occupant. This displacement is only then triggered when a vehicle deceleration suggesting a special strain on the head or neck region or some other extraordinary (possibly future) effect on the vehicle has been detected for example by a sensor. For this in particular an acceleration sensor or a proximity sensor (pre-crash sensor) is particularly suitable. This sensor need not necessarily be associated directly with the head rest arrangement itself but for this a sensor can be used which is present in any case for detection of a crash situation and for triggering an airbag device or some other safety device.

By upright function position of the backrest frame is presently meant a position of the backrest frame in which it extends—in relation to the state of the corresponding vehicle seat installed in a motor vehicle—substantially along the vertical vehicle axis. By backrest longitudinal direction of the backrest frame is meant that direction along which extends the spinal column of an occupant seated upright on the corresponding vehicle seat. If the backrest frame is located in its upright function position then the backrest longitudinal direction runs substantially along the vertical vehicle axis.

A head rest arrangement of the type mentioned at the beginning is known from the German Patent 100 51 344 C1. With this arrangement the head rest swivels about an imaginary (virtual) horizontal axis upwards and forwards in the direction of the head of an occupant located on the corresponding vehicle seat in order to ensure improved support of the head and neck region of the vehicle occupant.

The object of the invention is to improve a head rest arrangement of the type mentioned at the beginning.

BRIEF DESCRIPTION

According to this a device is provided for keeping the locking device in the unlocked position so long as the head rest is moved out from the useful position.

With the solution according to the invention it is achieved that the head rest after a crash-conditioned displacement from its useful position can be readily returned back to the useful position since the locking device after displacement of the head rest out from its useful position does indeed remain unlocked as before and thus the head rest can be returned to the useful position once more without the locking device acting against same.

The head rest can then after a crash-conditioned displacement from its useful position be returned readily back into its useful position, e.g. by the head rest being moved through manual force action back again in the direction of its useful position. This means that after a crash-conditioned displacement of the head rest it is not necessary to visit a workshop or take any other expensive steps in order to return the head rest back into a position in which it is positioned for normal operation of the corresponding motor vehicle. This has the result that the threshold for triggering the displacement of the head rest can be set correspondingly lower since the head rest displacement can then be cancelled without special expense and without special costs. Thus the triggering of the displacement of the head rest need not be restricted to serious accidents but can for example also be triggered with a sharp vehicle deceleration owing to emergency braking or with external action on the vehicle on overcoming an obstruction such as e.g. a kerb.

In order in normal operation of the vehicle to ensure reliable locking of the head rest in its relevant useful position the locking device is pretensioned by at least a first elastic element towards the locked state.

In order on the other hand with a crash-conditioned displacement of the head rest from its useful position to move the locking device into the released state at least a second elastic element can be provided with which the locking device is biased in the direction of the unlocked state.

The two elastic elements are to be matched with each other so that with a head rest in the useful position the locking device is reliably locked under the action of the first elastic element. This can be achieved for example through a correspondingly greater spring force of the first elastic element or even through the use of corresponding lever arms.

When moving the head rest forwards out from its useful position it is necessary to operate on the locking device so that the second elastic element can hold the locking device in the released state without being impeded by the first elastic element. Different measures for this will be described in more detail below.

In order to hold the released locking device in a precisely defined position at least one stop is provided which when the locking device is unlocked acts on a component part of the locking device which is pressed against this stop by way of example under the action of the first elastic element which is pretensioned in the locking direction. The stop can be formed in particular through an engagement element which can be brought into positive engagement with the corresponding component part of the locking device in order to hold this in a defined position in the released state.

For this in event of a crash-conditioned displacement of the head rest the stop can be brought (through swivel action) into a position in which it acts on the associated component part of the adjusting device. Taking up this position can be undertaken automatically by the stop being pretensioned to the position where it acts on the locking device. The stop is then assigned a securing element which holds the stop against the action of the elastic pretension in a position in which it does not act on the locking device so long as the head rest is locked in its useful position.

In a further preferred embodiment of the invention the component part of the locking device on which the stop acts in the unlocked state of the locking device is brought into a position where the stop can act on this component part only in the event of a crash-conditioned displacement of the head rest. This can be achieved by way of example through an actuating element which when the head rest is displaced is moved together with same and hereby acts on the locking device.

The locking device itself is preferably mounted fixed on the frame so that during displacement of the head rest it does not move in unison therewith.

For locking the head rest in its useful position the locking device has according to one embodiment a primary locking element which in the locked state of the locking device interacts with a holding element of the head rest so that the head rest is not displaceable and which can be actuated in a crash situation so that the head rest is released for displacement.

The primary locking element can be for example a swivel-mounted locking pawl which in the locked state of the locking device engages round the holding element on the head rest side and which in the event of a crash is actuated so that it releases the holding element and thus enables displacement of the head rest.

In a preferred embodiment of the invention the primary locking element is pretensioned by an elastic element in the direction of the unlocked state in which it would release the holding element; it is however prevented from taking up the corresponding position through a further secondary locking element.

According to a further development of the invention it can be proposed that the holding element acts at the same time as an actuating element which during displacement of the head rest from its useful position acts on an actuating section of the primary locking element provided for this purpose so that a further component part of the locking device, namely the secondary locking element, can be brought into a position in which the stop of the engagement element can act on this component part.

To unlock the locking device in a crash situation the secondary locking element which is preferably designed as a locking lever is actuated so that it no longer holds the primary locking element in the position where it engages round the holding element on the head rest side. The primary locking element then releases the holding element automatically under the action of the elastic means provided for this purpose and thereby allows the head rest to move out from its useful position.

If the secondary locking element is pretensioned through corresponding elastic means in the direction of such a state in which it acts on the primary locking element in order to hold the locking device in the locked state then the actuating device which is to be triggered (sensor-controlled) in a crash situation has to be designed so that it can bring the secondary locking element against the action of the elastic pretension out of engagement with the primary locking element. Basically for this any electrical or mechanical means which can be triggered through an acceleration sensor and which can apply a sufficiently large actuating force are suitable whereby electromagnets are particularly suitable for producing large actuating forces as a result of a sensor signal. An electromagnet of this kind can be in active connection with the locking device, more particularly its secondary locking element, by way of example through a tension or push rod in order to unlocking the locking device in the event of a crash.

Advantageously at the end of the return movement of the displaced head rest back into its useful position the locking device is automatically locked again so that the head rest is again locked in its useful position for further use. This can be achieved in that as the head rest moves back from its displaced position into the useful position the securing element acts on the engagement element associated with the locking device so that this no longer holds the locking device in the unlocked position. The movement of the engagement element proposed for this under the action of the securing element on the head rest side is thereby possible in that the actuating element associated with the locking device, more particularly its primary locking element acts on the locking device and hereby unblocks the engagement element so that this can be moved out from its engagement position in which it holds the locking device in the unlocked state.

The transfer of the locking device into the locked state is then carried out finally under the action of that elastic element with which the locking device is pretensioned towards the locked state.

In order to release the energy which is required to move the head rest in a crash situation an energy accumulator can be provided which provides for example chemical or elastic energy. In a preferred embodiment the energy accumulator is formed through an elastic means, more particularly in the form of at least one spring element which is pretensioned against the head rest so that it has the tendency to displace the head rest whereby the locking device counteracts the displacement of the head rest so long as the locking device has not been unlocked as a result of a crash,

BRIEF DESCRIPTION OF THE DRAWINGS

Further features and advantages of the invention will become clearer in the following description of an embodiment with the help of the drawings.

FIG. 1b is a perspective view of the head rest arrangement of FIG. 1a;

FIG. 2a is a view of the head rest arrangement of FIG. 1a after displacement of the head rest;

FIG. 2b is a perspective view of the head rest arrangement of FIG. 1a after displacement of the head rest;

FIG. 3a is a principle view of a device for locking the head rest of FIG. 1a in its useful position prior to displacement;

FIG. 3b is a view of the locking device after unlocking;

FIG. 5c is a view of the locking device of FIG. 5a in the unlocked state in the event of displacement of the head rest;

FIG. 5e is a view of the locking device of FIG. 5a during return of the head rest to its useful position after displacement;

FIG. 5f is a view of the locking device of FIG. 5a in a continued stage during return of the head rest into its useful position;

DETAILED DESCRIPTION

In the following there will first be described with reference to FIGS. 1 to 4 a device for displacing the head rest out from its useful position in the event of a crash, namely by swiveling the head rest. Two embodiments of a locking device for such a head rest arrangement which after displacement of the head rest can be held in the unlocked state will then be described with reference to FIGS. 5a to 5f and 6.

Figure 1A:
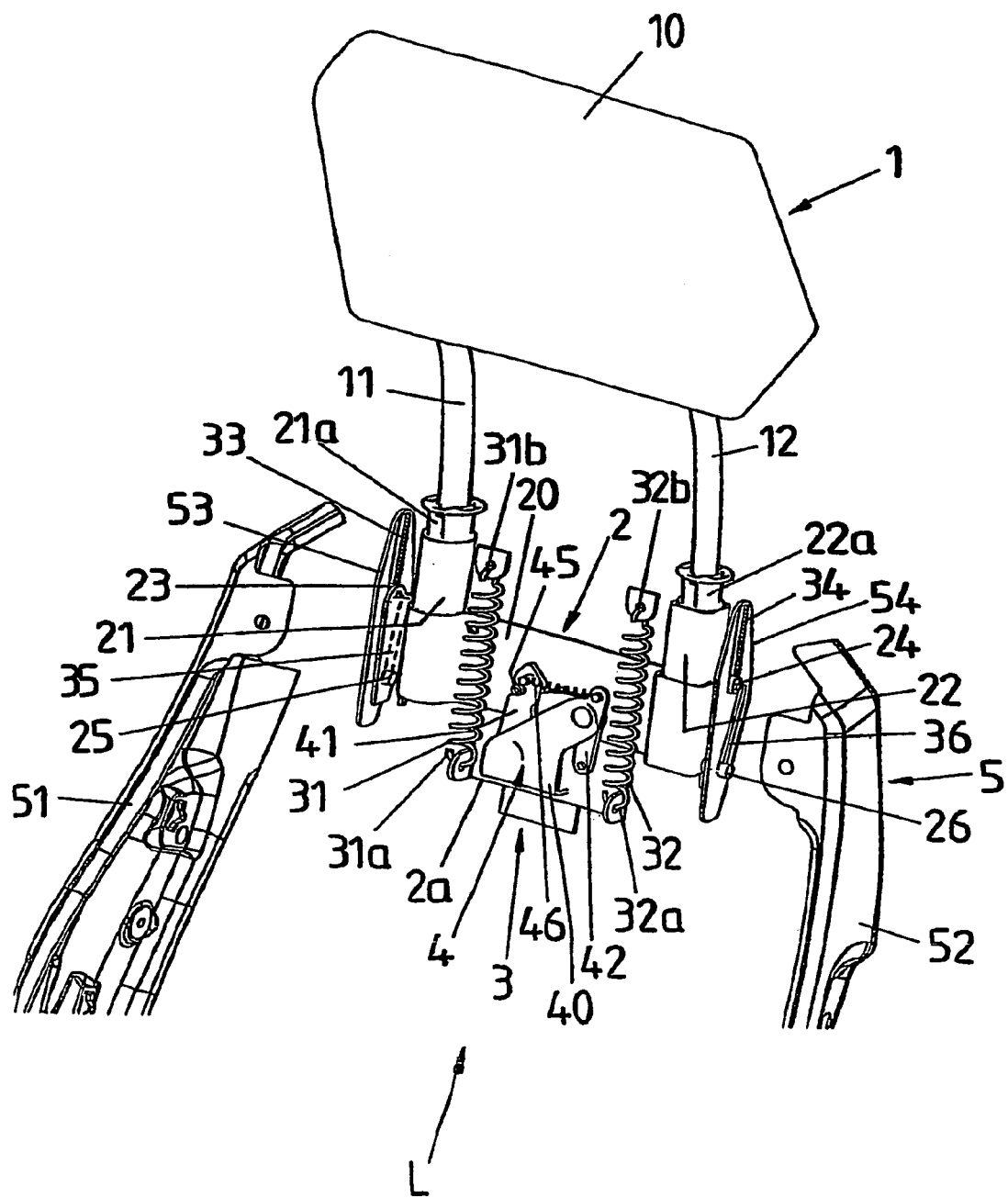
FIG. 1a is an exploded view of a head rest arrangement with a head rest which is vertically adjustable relative to a backrest frame and which in addition in a crash situation can be moved out from its relevant useful position.
Figure 1B:
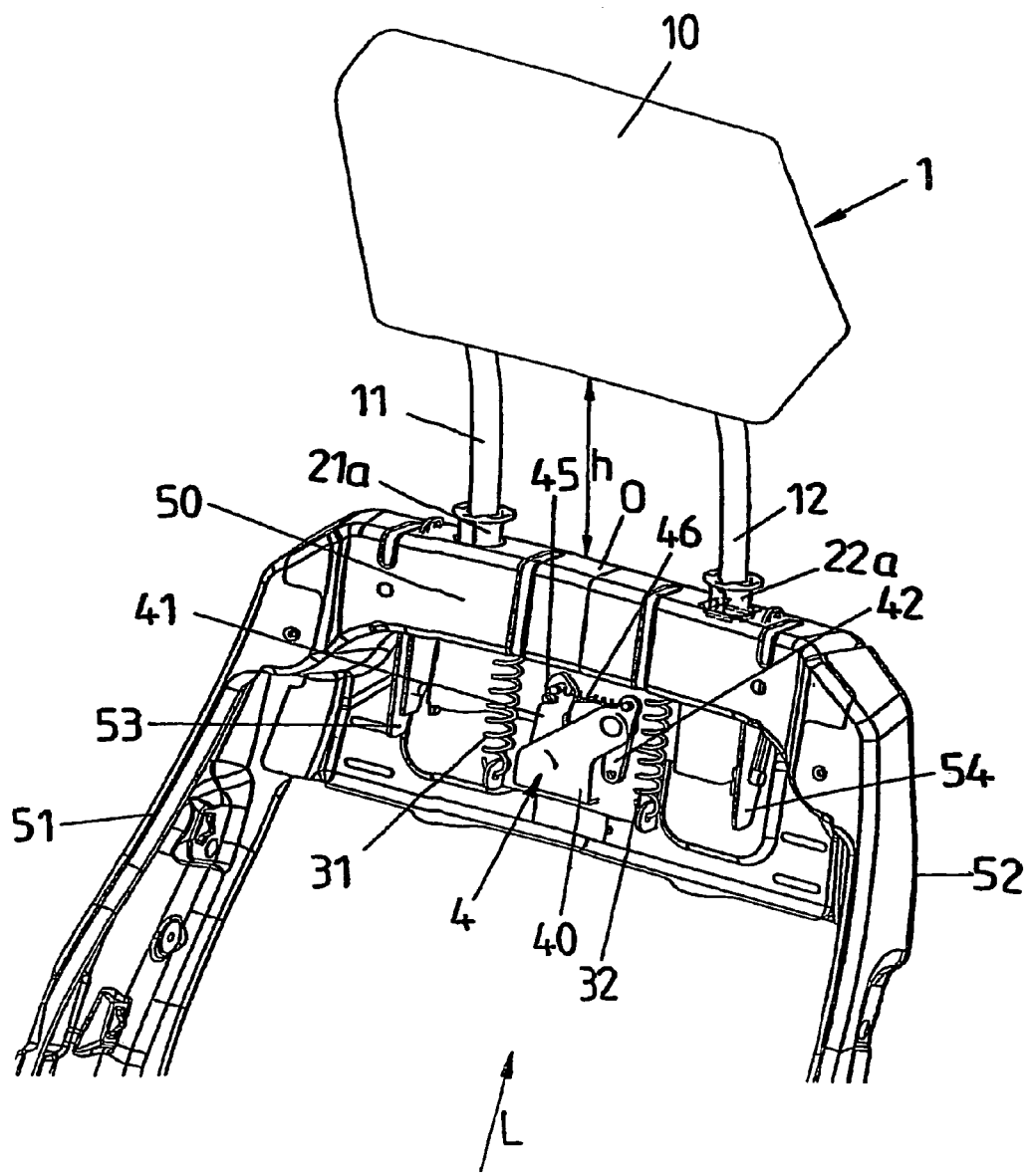
Figure 1C:
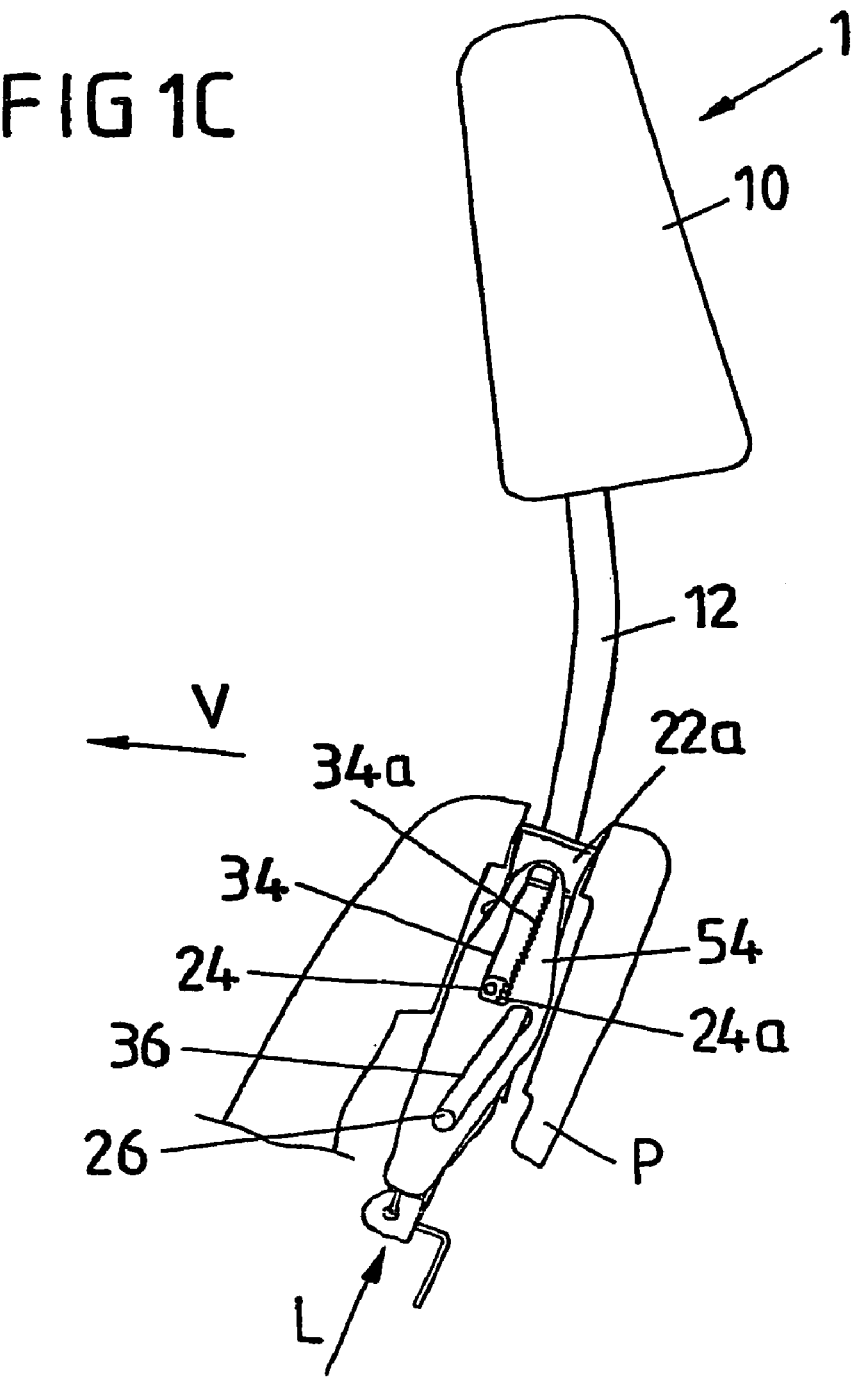
FIG. 1c is a side view of the head rest arrangement of FIGS. 1a and 1b.

FIGS. 1a to 1c show together with FIG. 3a a head rest arrangement for a motor vehicle seat with a head rest structural group 1 (here also simply called head rest) which has a head rest body 10 fixed on two guide rods 11, 12 in the form of guide bars. The two guide rods 11, 12 are housed longitudinally displaceable in guide sleeves 21, 22 which are provided on a base plate 20 of a head rest support 2 and from the upper end sections 21a, 22a of which project the guide rods 11, 12 with the head rest body 10.

The head rest structural group 1 is fixed through the head rest support 2 on a backrest frame 5 of a motor vehicle seat which comprises two backrest side parts 51, 52 as well as a backrest head 50. The backrest head 50 forms the upper end section of the backrest frame 5 and defines the upper edge O thereof. The backrest frame 5 extends along a backrest longitudinal direction L which corresponds substantially to the extension direction of the spinal column of a person located on the corresponding vehicle seat and leaning back against the backrest. With a vehicle seat installed in a motor vehicle with its backrest brought into the upright position the backrest longitudinal direction L runs substantially along the vertical vehicle axis (z-axis).

By moving the guide rods 11, 12 in the associated guide sleeves 21, 22 which extend along the backrest longitudinal direction L it is possible to adjust the height h of the head rest body 10 relative to the upper edge O of the backrest frame 5, i.e. the distance of the head rest body 10 from the upper edge O of the backrest frame 5 in order to set a useful position of the head rest adapted to the relevant occupant. For this different manual or externally actuated (electric) drives are known which can be mounted on the base plate 20 or on the head rest structural group 1. An illustration of the drive for adjusting the height h of the head rest body 10 has been omitted here since the present invention is independent of the type of drive used for adjusting the height h of the head rest body 10.

In addition to a device for adjusting the height of the head rest body 10 a device is provided for moving the head rest body 10 in a crash situation by which a swivel movement of the head rest body 10 can be produced through which this is movable in a direction upwards along the backrest longitudinal axis L as well as forwards in a direction V perpendicular to the backrest longitudinal axis L. Through such a movement in the event of a crash the head rest body 10 is to be guided forwards against the head and neck of the vehicle occupant located on the corresponding vehicle seat thereby preventing at the same time the vehicle occupant catching his head in the region between the upper edge of the head rest body 10 and the roof.

The device for swiveling the head rest body 10 engages on the base plate 20 of the head rest support 2 belonging to the head rest structural group 1 and comprises two tension springs 31, 32 which are mounted parallel to each other extended in the longitudinal direction L of the backrest and which each are hung by their lower end 31a, 32a from a projection 2a of the head rest support 2 and by their upper ends 31b and 32b from the backrest head 50. The two spring elements 31, 32 are pretensioned relative to each other so that they have a tendency to lift the base plate 20 of the head rest support 2 and thus the head rest 1 as a whole along the longitudinal direction L of the backrest.

Movement of the head rest 1 together with the head rest support 2 under the action of the pretensioned spring elements 31, 32 is however prevented through a locking device 4 shown in a principle illustration in FIG. 3a mounted on a support 40 fixed relative to the backrest frame. This locking device 4 comprises a primary locking element 41 swivel mounted about an axis 43 in the form of a swivel mounted locking pawl with locking claw 41a which in the locked state of the locking device 4 engages round a holding element in the form of a projection (locking bolt 45) protruding from the base plate 20 of the head rest support 2. Movement of the base plate 20 relative to the support 40 of the locking device 4 fixed on the backrest frame and thus movement of the head rest structural group overall relative to the backrest frame 5 is hereby prevented. The primary locking element 41 is elastically pre-tensioned by an elastic element in the form of a tension spring 46 which engages by one end 46a on the locking element 41 and by the other end 46b on the support 40 so that it has the tendency to release the locking bolt 45. However this is counteracted by a secondary locking element 42 swivel mounted about a second axis 44 in the form of a locking lever which presses with a stop face 42b against an associated stop face 41b of the primary locking element 41 and therefore prevents movement of the primary locking element 41 under the action of the elastic element 46.

The secondary locking element 42 has an engagement point 42a for an actuating device which is triggered in the event of a crash and engenders a swivel movement of the secondary locking element 42 about its swivel axis 44. For this it is possible to use by way of example a sensor-controlled actuator in the form of an electromagnet (lift magnet), an electric motor or a pyrotechnic charge, or a mass pendulum coupled to an actuating lever or a coupling mechanism which couples the secondary locking element 42 to a belt tensioner.

Independently of the physical and technical principle used to actuate and swivel the secondary locking element 42 it is important that the corresponding movement of the secondary locking element 42 is reliably triggered in a crash situation and that the secondary locking element 42 is otherwise held in a position in which it prevents movement of the primary locking element 41. In order to achieve the last-mentioned function the secondary locking element 42 can be fixed by way of example by using a further elastic element (not shown in the drawings) in the position illustrated in FIG. 3*a* in which it prevents movement of the primary locking element 41 about its swivel axis 43. The force applied by the correspondingly elastic element for fixing the secondary locking element 42 has to be overcome by the force which is applied when actuating the secondary locking element 42 through an actuator, belt tensioner or the like.

In order to achieve a defined swivel movement of the head rest body 10 after unlocking of the locking device 4 under the action of the spring elements 31, 32 the base plate 20 of the head rest support 2 is guided in associated longitudinal guides (slide guides) 33, 34 and 35, 36 of guide parts 53, 54 fixed on the frame by guide elements 23, 24 and 25, 26 provided on the angled end sides of the base plate 20.

The guide parts 53, 54 which are mounted on each longitudinal side 51, 52 of the backrest frame 5 thereby each have two guide slides 33, 35 and 34, 35 mounted one above the other in the longitudinal direction L. The guide slides 33, 34 and 35, 36 of the one guide part 53 and other guide part 54 mounted at the same level along the backrest longitudinal direction L are each formed identical.

The upper guide slides 33, 34 in the backrest longitudinal direction run substantially parallel to the backrest longitudinal direction L and are inclined only slightly relative to same. They thus also extend substantially parallel to the guide rods 11, 12 in the region of their exit from the upper end sections 21*a*, 22*a* of the guide sleeves 21, 22. The lower guide slides 35, 36 are inclined more steeply here relative to the backrest longitudinal direction L, namely each from front downwards and back upwards.

The interaction of the guide slides 33, 35 and 34, 36 mounted one above the other in the backrest longitudinal direction L on the two longitudinal sides of the backrest frame 5 produces the desired swivel movement of the head rest body 1 as will be explained in further detail below.

In the event of a collision, more particularly a rear shunt crash the locking device 4 associated with the base plate 2 is unlocked through action on the secondary locking element 42 by a mechanism previously described, as shown in FIG. 3*b*. The said mechanism acts on the engagement point 42*a* of the secondary locking element 42 and thus causes a swivel movement of the second locking element 42 about its swivel axis 44 through which the stop face 42*b* of the secondary locking element 42 is moved away from the primary locking element 41 so that this can swivel about its axis 43 under the action of the associated elastic element 46. The primary locking element 41 hereby releases the locking bolt 45 so that movement of the base plate 20 of the head rest support 2 under the action of the spring elements 31, 32 engaging on the base plate 20 is no longer opposed.

The movement of the primary locking element 41 about its axis 43 is moreover triggered or intensified by a stop of the secondary locking element 42 which acts on an associated stop of the primary locking element.

Under the action of the elastic energy stored in the pretensioned spring elements 31, 32 as energy accumulators the base plate 20 of the head rest support 2 is now moved upwards. As a result of the guidance of the base plate 20 by the guide elements 23, 24; 25, 26 in associated guide slides 33, 34 and 35, 36 a swivel movement is completed which corresponds to a combined movement in the backrest longitudinal direction L upwards as well as in a direction forwards V perpendicular hereto. This swivel movement is transferred directly to the head rest body 10 mounted on the head rest support 2 through the guide rods 11, 12.

Figure 4:
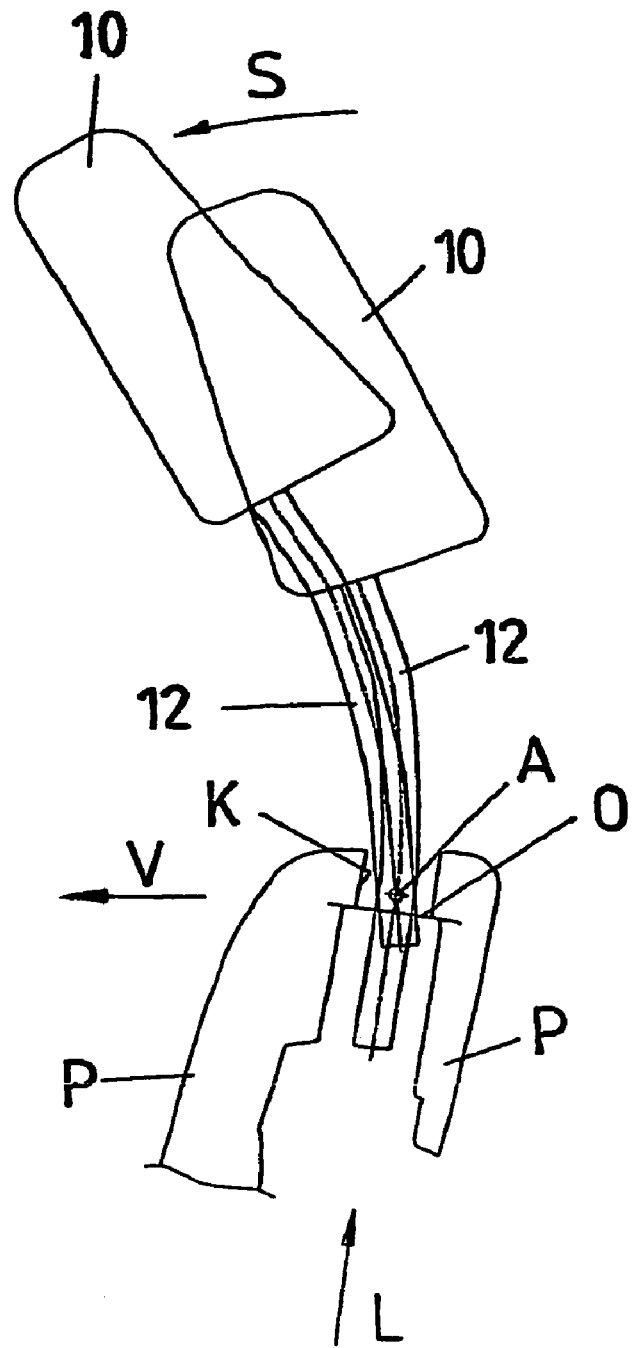
FIG. 4 is a diagrammatic view of the displacement of the head rest of FIGS. 1a to 2c.

The corresponding swivel movement S can be seen from FIG. 4 in which the head rest body 10 is shown on the one hand in its starting position prior to executing the swivel movement and on the other in its end position after execution of the swivel movement S.

It can clearly be seen that the swivel movement S causes a displacement of the head rest body 10 on the one hand upwards along the backrest longitudinal direction L and on the other hand forwards perpendicular thereto in a direction V forwards so that the head rest body 10 is moved up to the head of a vehicle occupant seated on the corresponding vehicle seat and thereby engages over the head in particular so that this cannot pass beyond the upper edge of the head rest body 10.

From FIG. 4 it is further clear that the swivel movement S corresponds to a movement about a virtual axis A which extends horizontal above the upper edge O of the backrest head 50 (see FIGS. 1*a* and 1*b*), i.e. perpendicular to the backrest longitudinal direction L and thereby intersects the guide rods 11, 12 of the head rest structural group. The backrest cushion P provided on the backrest frame has above the upper edge O of the backrest head a channel-like recess K of such size that the swivel movement of the guide rods 11, 12 about the swivel axis A is not impeded by the upholstered cushion P.

FIG. 4 shows a particularly advantageous position of the swivel axis A above the upper edge O of the backrest head in which this intersects the guide rods 11, 12 of the head rest 1 and thus runs in the plane spanned by the guide rods 11, 12 or directly above the upper edge O of the backrest head. I.e. a straight line extending in the longitudinal direction L of the backrest and intersecting the swivel axis A would also intersect the upper edge O of the backrest head.

The swivel axis can however also basically be mounted at some other point above the upper edge O of the backrest head, for example perpendicular to the backrest longitudinal direction L spaced from the backrest frame in front or behind the backrest frame. It is decisive that the swivel axis A in the backrest longitudinal direction L lies at a level corresponding at least to the height of the upper edge O.

Figure 2C:
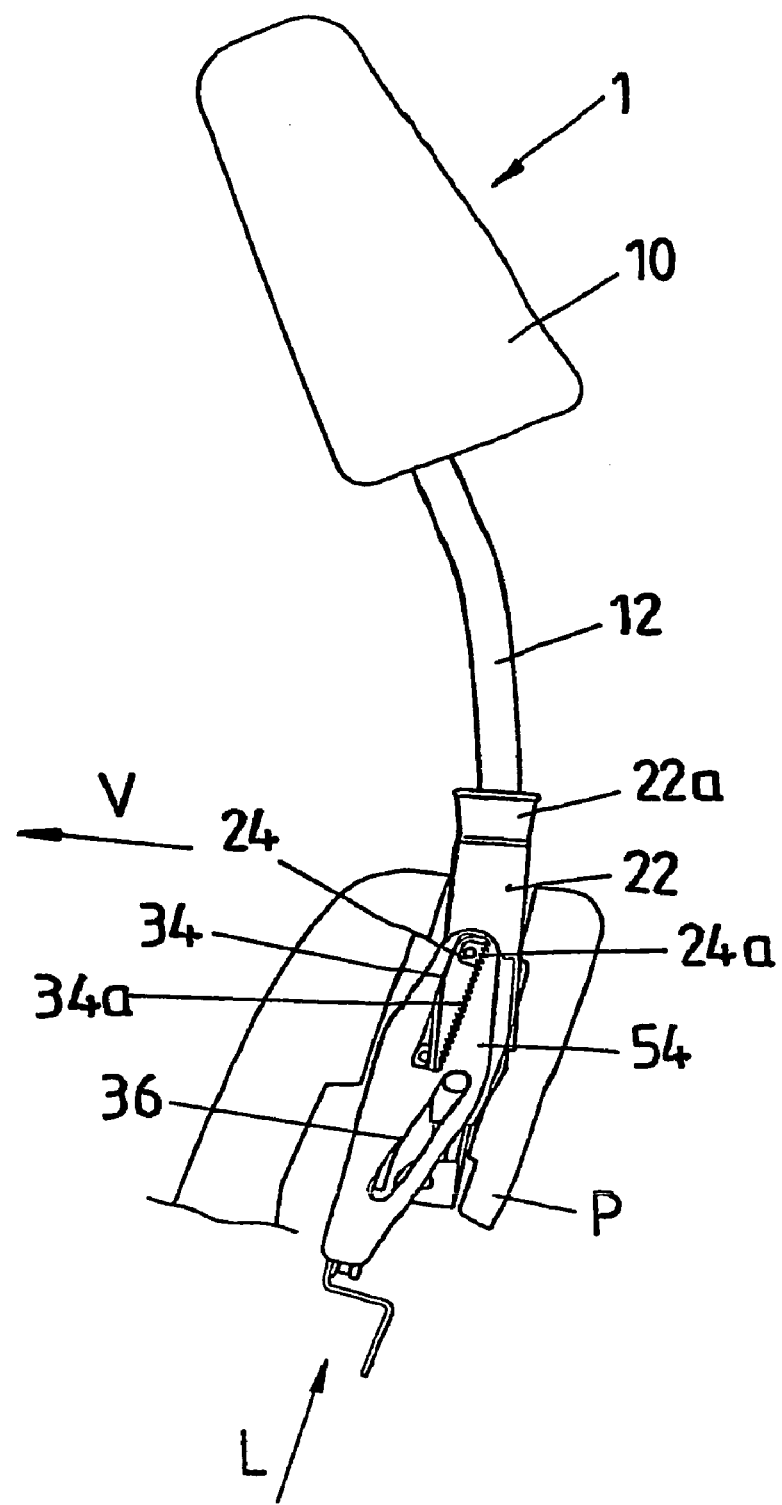
FIG. 2c is a side view of the head rest arrangement of FIG. 1a after the displacement of the head rest.

FIGS. 2*a* to 2*c* show the head rest arrangement of FIGS. 1*a* to 1*c* at the completion of the swivel movement of the head rest 1. It is clear from the figures that the guide elements 23, 24, 25, 26 provided on the head rest structural assembly 1, more precisely on the base plate 20 of the head rest support 2 were moved in the relevant guide slides 33, 34, 35, 36 from the lower end (lower stop) to an upper end (upper stop), namely under the action of the spring elements 31, 32 engaging on the base plate 20. This has led to the swivel movement of the head rest 1 into the end position shown in FIGS. 2*a* to 2*c*.

It can be seen in particular from FIGS. 1*c* and 2*c* that the relevant upper guide slide 33, 34 extends in the associated guide part 53, 54 substantially along the backrest longitudinal direction L whilst the relevant lower guide slide 36, 37 is inclined sharply towards the backrest longitudinal direction L. This generates the desired swivel movement about an axis A (see FIG. 4) above the upper edge O of the backrest head.

Furthermore it is clear from FIGS. 1c and 2c on the example of one of the two upper guide slides 33, 34 that the guide slide 34 can be provided on a long side with a longitudinal toothing 34a which would be assigned to a corresponding toothing 24a of the guide element 24 guided in the slide guide 34. The toothings 24a, 34a are formed as inclined splines so that they do indeed permit movement of the guide element 24a in the backrest longitudinal direction L which leads to swiveling of the head rest 1 but not a movement along the opposite direction downwards. The head rest structural assembly overall and thus more particularly the head rest body 10 is hereby fixed in its end position after the swivel movement has been executed. This prevents that in the event that the head of the vehicle occupant being protected impacts on the head rest body 10 the latter will be moved back again readily into its original position. The interengaging toothed regions 24a, 34a thus serve as a resetting lock which prevents immediate resetting movement of the head rest from the end position produced through swivel movement.

A resetting movement is indeed then possible if the two toothings 24a, 34a are brought out of engagement, for example by exerting a tension or compressive force on the head rest body 10 in a direction V forwards perpendicular to the backrest longitudinal direction L. If the toothings 24a, 34a are out of engagement then the guide element 24 can be moved down again in the guide slide 34 and the complete head rest structural group moves into its starting position (useful position) when the state of the locking device 4 permits this whereby the spring elements 31, 32 (see FIGS. 1a and 1b) are tensioned again. They thus store elastic energy again in order to be able to swivel the head rest 1 again when necessary. This is thus a reversible safety device.

For a return of the head rest from its position displaced through swivel movement back into its useful position it is proposed to keep the locking device in its unlocked state so long as the head rest is located outside of its useful position, thus displaced (swiveled) crash-conditioned. Two embodiments of a mechanism suitable for this will now be described below with reference to FIGS. 5a to 5f and FIG. 6.

Figure 5A:
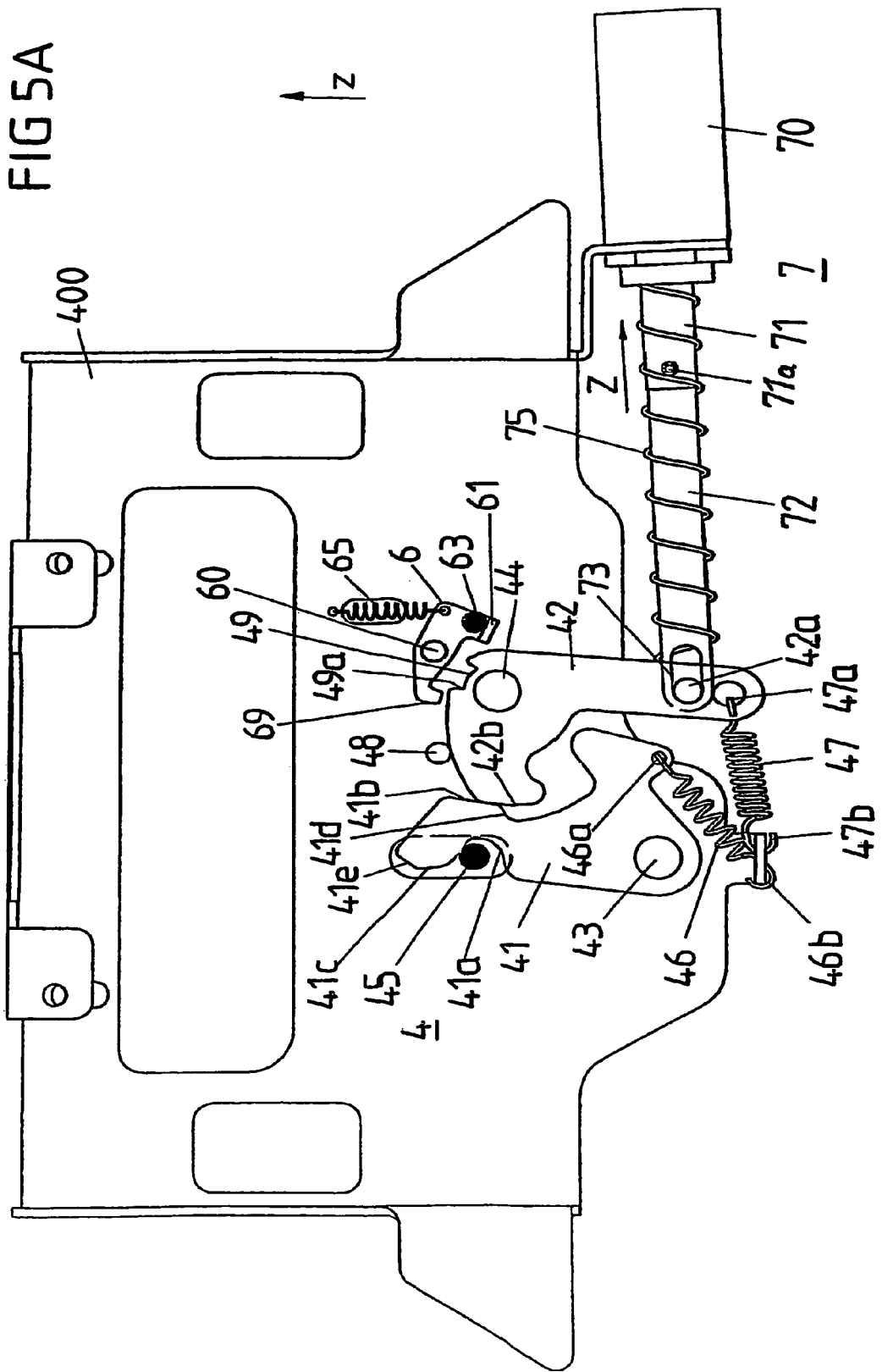
FIG. 5a is a further development of the locking device of FIGS. 3a and 3b which during displacement of the head rest can be halted in its unlocked state.

FIG. 5a shows a further development of the locking device shown only in its principle design in FIG. 3a and now in the locked state for a head rest located in a useful position.

The locking device 4 illustrated in FIG. 5a is mounted on a support plate 400 fixed on the backrest and comprises a primary locking element 41 in the form of a locking pawl capable of swiveling about an axis 43 as well as a secondary locking element 42 in the form of a locking lever capable of swiveling about a further axis 44.

The primary locking element 41 has a locking claw 41a formed by a recess which in the locked state of the locking device 4 engages round the holding element in the form of a projection (locking bolt 45) protruding from the base plate 20 of the head rest support 2 (see FIG. 1a). Movement of the base plate 20 opposite the support 400 of the locking device 4 fixed on the backrest frame and thus movement of the head rest structural group 1 as a whole relative to the backrest frame 5 is hereby prevented.

The primary locking element 41 is elastically pretensioned by an elastic element in the form of a tension spring 46 which engages by one end 46a on the primary locking element 41 and by the other end 46b on the support 400 so that it has a tendency to release the locking bolt 45. This is counteracted however by the secondary locking element 42 which is pressed by a stop face 42b against an associated stop face 41b of the primary locking element 41 and therefore prevents movement of the primary locking element under the action of the elastic element 46. The secondary element 42 is for this pretensioned by an associated elastic element 47 in the form of a tension spring which engages by one end 47a on the secondary locking element 42 and by the other end 47b on the support 400, in a position in which it prevents release of the locking bolt 45 under the action of the elastic element 46 which is associated with the primary locking element 41. The spring force of the two elastic elements 46, 47 formed by tension springs and which engage on the primary and secondary locking elements 41 and 42 are therefore attuned with each other so that the torque generated by the tension spring 47 associated with the secondary locking element 42 is so great that it cannot be overcome by the tension spring 46 associated with the primary locking element 41. Apart from the spring constants of the tension springs 46, 47 the corresponding lever arms of the primary locking element 41 and of the secondary locking element 42 also play a role, as well as the eccentric angle between the stop faces 41b and 42b which is located in the self locking region.

A stop 48 which interacts with a surface section of the secondary locking element 42 and hereby in the locked state of the locking device 4 ensures the defined position of the secondary locking element 42 under the action of the associated tension spring 46 serves to define the swivel movement which the secondary locking element 42 can execute under the action of the associated tension spring 47.

The tension spring 47 which is associated with the secondary locking element 42 is moreover dimensioned so that even severe cross accelerations (mass forces in a crash situation) do not lead to opening of the locking mechanism 4 against the action of the tension spring 47.

The secondary locking element 42 is furthermore associated with a control lever 6 which is mounted to swivel about an axis 60 and has an engagement element 69 in the form of a locking nose which serves as a stop and which can be brought into engagement with an indentation 49 in the secondary locking element 42. For this the control lever 6 is elastically pretensioned by an elastic element in the form of a tension spring 65 in the direction of a position in which its locking nose 69 would engage in the associated indentation 49 of the secondary locking element 42. This is however prevented in the useful position of the head rest arrangement shown in FIG. 5a through a securing element in the form of a bolt 63 which is fixed on the base plate 20 of the head rest support 2 (see FIG. 1a) and which bears against an associated stop 61 of the control lever 6 thereby preventing swivel movement of the control lever which would lead to engagement with the secondary locking element 42.

In order to unlock the locking mechanism 4 in a crash situation the latter is associated with an unlocking mechanism 7 which comprises an electromagnet 70 designed as a pull magnet which is coupled to the secondary locking element 42 through its magnetic core 71 longitudinally movable in the pull direction Z and a tension rod 72 connected for articulated movement through an articulation bolt 71a whereby a bolt 42a provided on the secondary locking element 42 engages in an oblong hole 73 of the tension rod 72. A play compensation spring 75 is mounted on the tension rod 72 and is supported on one side on the housing of the electromagnet 70 and on the other side on the secondary locking element 42 which thereby prevents rattling noises.

Under the action of the tension spring 47 associated with the secondary locking element 42 the magnetic core 71 which is connected to the secondary locking element 42 through the tension rod 72 is drawn out of the housing of the electromagnet 70 namely over a path which is defined by the stop bolt 48 which is assigned to the secondary locking element 42.

In short FIG. 5a shows the locking mechanism of a head rest arrangement with the head rest located in the useful position and in the locked state, i.e. in a state in which the locking device 4 prevents the head rest from moving out of the useful position.

Figure 5B:
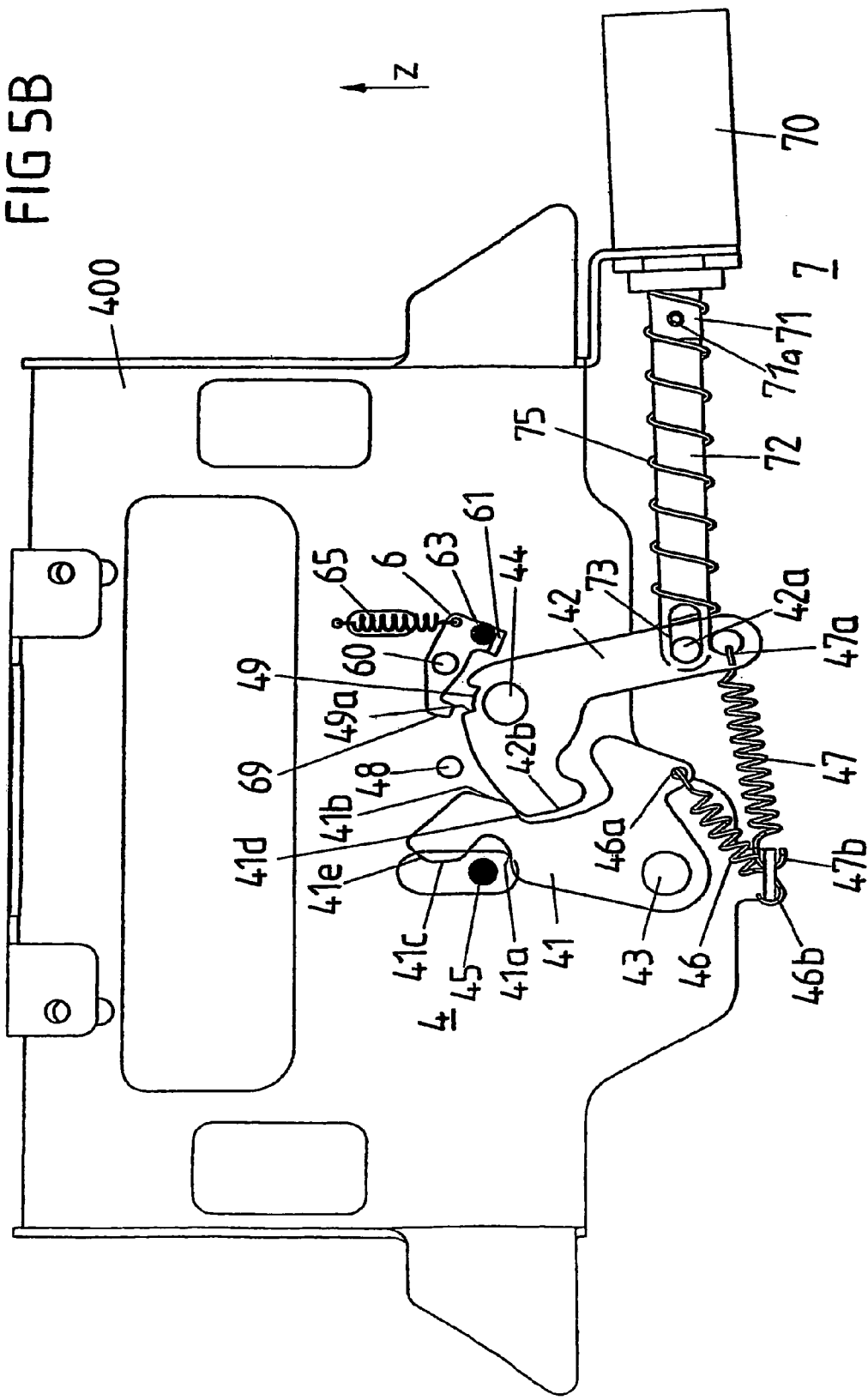
FIG. 5b is a view of the locking device of FIG. 5a in the unlocked state with the head rest still in its useful position.

In the event of sharp vehicle deceleration, more particularly in a crash situation, which is detected through a sensor provided for this purpose, more particularly an acceleration sensor, the electromagnet 70 is energised and draws the magnetic core 71 against the action of the tension spring 47 associated with the secondary locking element 42 into the housing of the electromagnet 70 up to a stop fixed on the housing, see FIG. 5b. The secondary locking element 42 is hereby swiveled about its swivel axis 44 so that its stop face 42b no longer bears against the associated stop face 41b of the primary locking element 41 whereby the section of the secondary locking element 42 provided with the stop face 42b engages in a suitably shaped recess of the primary locking element 41. This therefore swivels under the action of the associated tension spring 46 so that the locking claw 41a of the primary locking element 41 releases the locking bolt 45 fixed on the head rest. The pre-conditions for movement of the head rest out from its useful position in a crash situation are thereby provided as has been described above by way of example for a swivel movement with reference to FIGS. 1a to 4.

In the state of the locking device 4 illustrated in FIG. 5b however such a movement of the head rest has still not taken place; rather the head rest is located with the unlocked locking device 4 as before in its useful position illustrated in FIG. 5a.

FIG. 5c shows the locking device 4 at the start of movement of the head rest 4 along the vertical vehicle axis z upwards and where applicable additionally forwards (corresponding to a swivel movement). It can be seen that the locking bolt 45 has slid along an inclined face of the locking claw 41a of the primary locking element 41 out from the latter and now acts as actuating element on a section 41c of the primary locking element 41 adjoining the locking claw 41a. This leads to an additional swiveling of the primary locking element 41 (in the same direction as the swivel movement triggered through the associated tension spring 46) and to an action of the primary locking element 41 on the secondary locking element 42 by a protrusion 41d provided for this purpose on the primary locking element 41. This in turn causes an additional swivel movement of the secondary locking element 42 against the action of the associated tension spring 47 whereby the bolt 42a provided on the secondary locking element 42 is moved in the oblong hole 73 of the tension rod 72 (since the magnetic core bears against the stop fixed on the housing) and the indentation 49 provided on the secondary locking element 42 is brought into a position in which the locking nose 69 of the control lever 6 (released by the upward displacement of the bolt 63 serving as securing element) can engage in same. In order to make it easier to insert the locking nose 69 into the indentation 49 the locking nose 69 is thereby spaced slightly from the associated side stop 49a of the indentation 49.

The section 41c of the primary locking element 41 adjoining the locking claw 41a has such a length that in the event of a crash-conditioned displacement of the head rest the locking bolt 45 on the head rest side slides sufficiently far along this section to enable the locking nose 69 of the control lever 6 to engage in the associated indentation 49, see FIG. 5c.

Figure 5D:
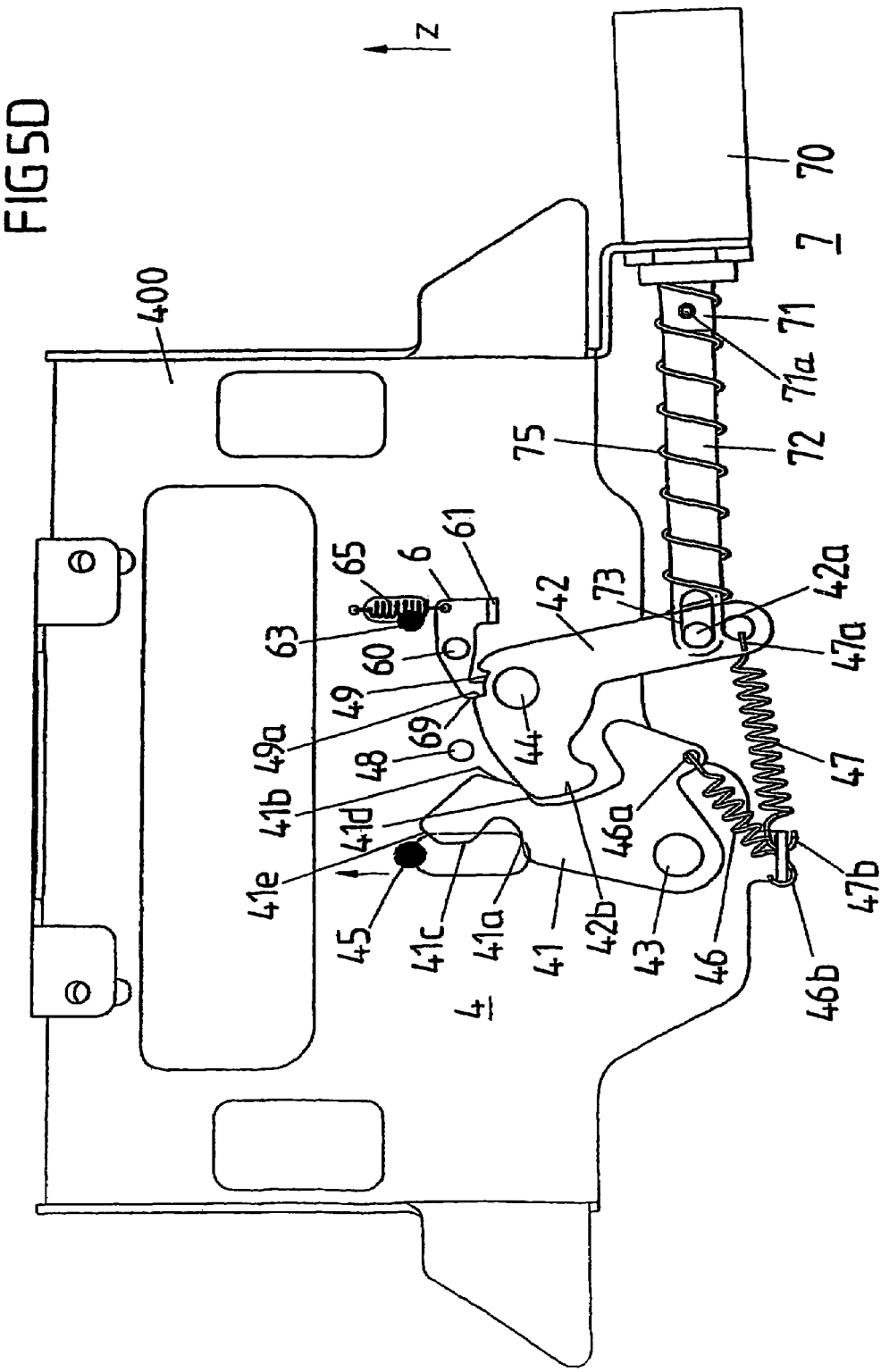
FIG. 5d is a view of the locking device of FIG. 5a in the unlocked state in a further stage of the displacement of the head rest.

With the subsequent displacement of the head rest shown in FIG. 5d out from its useful position the locking bolt 45 again moves out of engagement with the section 41c of the primary locking element adjoining the locking claw 41a so that the said locking element under the action of the tension spring 47 associated with the secondary locking element 42 is swiveled in turn slightly against the torque generated by its own tension spring 46 until the locking nose 69 of the control lever 6 bears against the associated side stop 49a of the indentation 49 on the primary locking element 41. The primary locking element 41 and the secondary locking element 42 under the action of the associated tension springs 46, 47 as well as through the interaction of the locking nose 69 with the stop 49a of the indentation 49 of the primary locking element 41 hereby occupy a defined position in which the locking device 4 is unlocked. I.e. the locking device 4 is continuingly located in a position in which the locking bolt 45 could be moved out from the locking claw 41 of the primary locking element 41, see FIG. 5d.

This has the main advantage that following a crash-conditioned displacement the head rest can as has been shown by way of example in FIGS. 1a to 4 be returned again to a useful position whereby the locking device 4 is again locked as will be described below with reference to FIGS. 5e and 5f.

FIG. 5e shows the locking device 4 when the head rest is slid from its crash-conditioned displaced position back into the useful position which had existed prior to the crash instance and in which the head rest body serves to support the head of a vehicle occupant in normal operation of the motor vehicle. The locking bolt 45 fixed on the head rest hereby finally engages with an associated incline 41e of the primary locking element 41 along which it is guided to the section 41c of the primary locking element 41 adjoining the locking claw 41a, see FIGS. 5e and 5f.

As soon as the locking bolt 45 as the head rest slides back has reached the section 41c adjoining the locking claw 41a a slight additional swivel movement of the primary locking element 41 takes place in the clockwise direction, as already described with reference to FIG. 5c whereby the locking nose 69 of the control lever 6 is brought out of engagement with the associated side stop 49a of the indentation 49 of the secondary locking lever 42. The bolt 42a provided on the secondary locking element 42 is hereby moved in the associated oblong hole 43 of the tension rod 72.

The additional slight deflection of the secondary locking element 42 under the action of a corresponding protrusion 41d of the primary locking element 41 against the pretension force of the tension spring 47 associated with the secondary locking element 42 is made possible more particularly in that the protrusion 41d acts on the secondary locking element 42 with a correspondingly large lever arm (in relation to the swivel axis 43 of the primary locking element 41).

As a result the locking nose 69 of the control lever 6 can now be lifted out of the indentation of the secondary locking element 42 by swiveling the control lever 6 about its swivel axis 60 as soon as with further sliding of the head rest back into its useful position (beyond the position shown in FIG. 5f) the stop bolt 63 on the head rest side strikes the associated stop 61 of the control lever 6 and deflects this against the action of the associated tension spring 65, corresponding to the starting position shown in FIG. 5a.

At the same time the locking bolt 45 on the head rest side during further backwards displacement of the head rest slides again into the region of the locking claw 41a of the primary locking element 41 and the latter is swiveled under the action of the secondary locking element 42 (no longer obstructed by the locking nose 69) so that the locking claw 41a engages round the locking bolt 45 as shown in the starting position according to FIG. 5a. The underlying swivel movement of the secondary locking element 42 which is transferred through the associated stop faces 42b, 41b to the primary locking element 41 is triggered through the tension spring 47 which is associated with the secondary locking element 42. The magnetic core 71 of the electromagnet 70 which is now no longer energised is hereby again drawn out from the housing of the electromagnet 70 and back into the starting position illustrated in FIG. 5a. (Energization of the electromagnet 70 ends as soon as the electromagnet 70 in a crash situation has fulfilled its function, namely the unlocking of the locking device 4 through action on the secondary locking element 42 which is indeed then held through the control lever 6 in a defined unlocked position. The electromagnet is then no longer further energised so that it does not stand in the way of a re-occupation of the initial position of the locking device 4 as the head rest slides back, as shown in FIG. 5a).

As a result the head rest is finally locked by the locking mechanism 4 again in its useful position shown in FIG. 5a. This would be possible in that the locking mechanism 4 during the forward displacement of the head rest was held permanently in an unlocked position which permits the head rest to return to its useful position. Occupying an unlocked position of this kind after actuation of the unlocking mechanism 7 would take place in particular under the action of the tension spring 46 associated with the primary locking element 41 as well as the interaction of the locking bolt 45 with the section 41c of the primary locking element 41 after the locking claw 41a. This defined unlocking position is fixed and held through the engagement of the locking nose 69 of the control lever 6 in an indentation 49 of the secondary locking element 42 whereby the locking nose 69 bears against a stop 49a of the indentation 49 under the action of the tension spring 47 of the secondary locking element 42.

Figure 6:
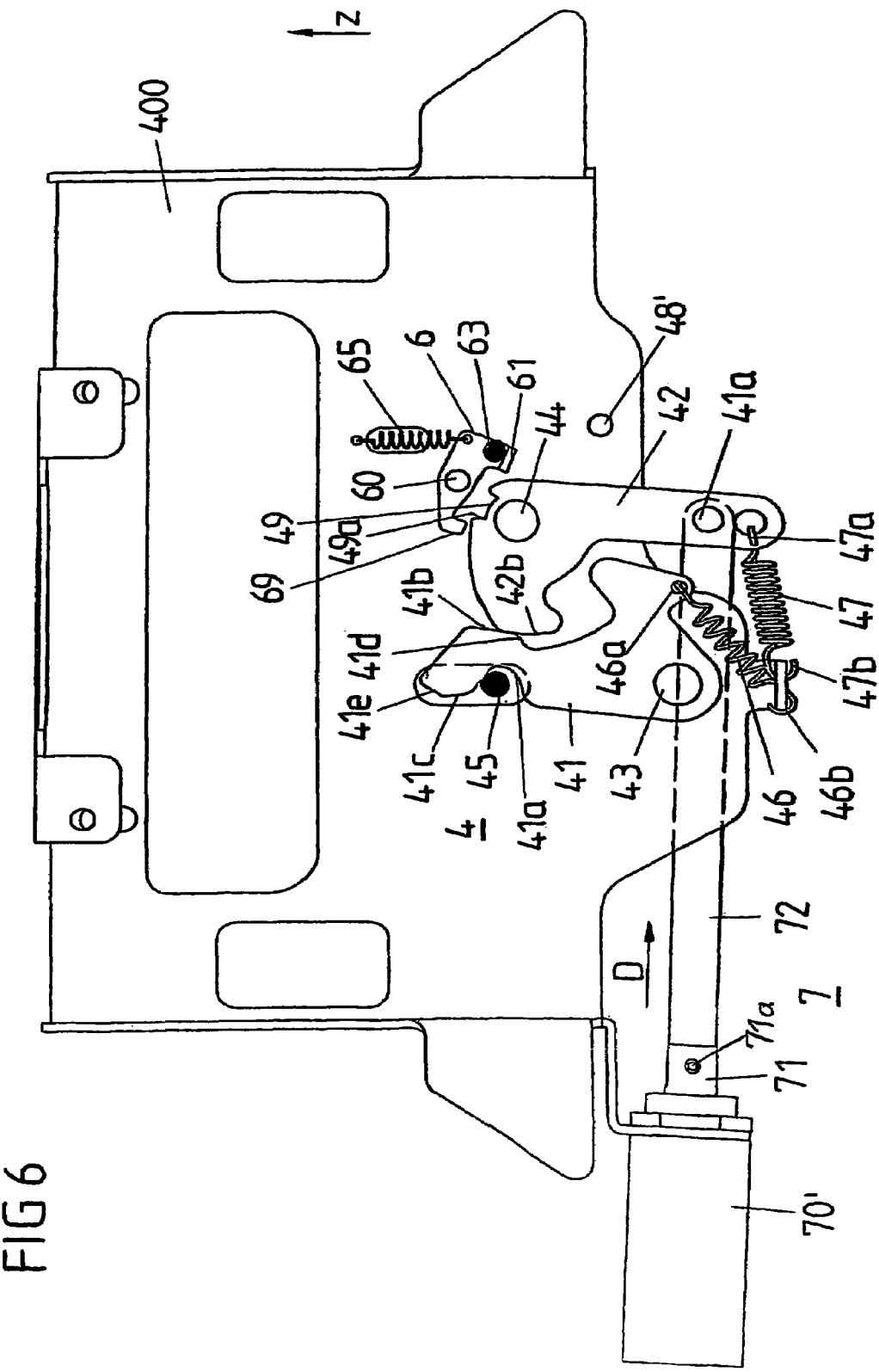
FIG. 6 is a modification of the locking device of FIG. 5a as regards the means for unlocking the locking device.

FIG. 6 shows a modification of the locking mechanism of FIG. 5a whereby the essential difference lies in that the electromagnet 70' of the unlocking mechanism 7 is formed as a pressure magnet and not as a pull magnet. Consequently the rod 72 adjoining the magnetic core 71 displaceable in the pressure direction D acts as a pressure rod on the secondary locking element 42 in order to deflect this to unlock the locking mechanism 4.

The pressure rod 72 is in this case connected directly (and not through an oblong hole) to the bolt 41a of the primary locking element 41 provided for this purpose. An oblong hole guide is in this case not necessary since the pressure rod 72 after unlocking of the locking mechanism 4 (as a result of energization of the pressure magnet 70' and a corresponding movement of the magnetic core 71 from the housing of the pressure magnet 70') can still be moved passively in the currentness state in order to allow an additional slight swivel movement of the secondary locking element 42 for engagement of the locking nose 69 in the indentation 49 of the primary locking element 41. The possible passive movement of the magnetic core 71 from the housing of the pressure magnet 70' is restricted through a stop 48' associated with the secondary locking element 42.

The stop 48 provided in the embodiment illustrated in FIG. 5a for restricting the swivel movement of the secondary locking element 42 which is provided between the primary locking element 41 and control lever 6 is omitted in this case since a swivel movement of the secondary locking element 42 is here restricted in the clockwise direction in that the pressure rod 72 can only be drawn by the magnetic core 71 into the housing of the pressure magnet 70' up to a stop fixed on the housing. The possible swivel movement of the secondary locking element 42 in the clockwise direction is hereby already restricted.

The invention claimed is:

1. A head rest arrangement for a motor vehicle seat comprising:
   a backrest frame for a backrest;
   a head rest that is fixable in at least one useful position on the backrest frame and which has a head rest body for supporting a head of a vehicle occupant;
   a displacement device to shift the head rest in a crash situation in order to move the head rest body relative to the backrest frame into a predeterminable position which is different from the useful position;
   a locking device which counteracts displacement of the head rest by the displacement device and which is releasable in a crash situation;
   a control device to keep the locking device in an unlocked state so long as the head rest is shifted out from the useful position;
   toothed regions serving as a resetting lock configured to prevent immediate resetting movement of the headrest from said predeterminable position produced through shifting the headrest in a crash situation;
   wherein the control device comprises at least one stop wherein when the locking device is unlocked the stop acts on a component part of the locking device so that the locking device is held in a state defined by the interaction of the stop with the component part; and
   wherein the stop continues to act on the component part while the headrest body is moved back into a useful position after the toothed regions have been brought out of engagement.

2. The head rest arrangement according to claim 1, wherein the locking device is pretensioned by at least one first elastic element in a direction of a locked state.

3. The head rest arrangement according to claim 2, wherein the locking device is assigned at least a second elastic element with which the locking device is biased in a direction of the unlocked state.

4. The head rest arrangement according to claim 3, wherein the head rest is locked in the at least one useful position under action of the first elastic element and against action of the second elastic element.

5. The head rest arrangement according to claim 3, wherein the locking device is movable into a released state by the second elastic element.

6. The head rest arrangement according to claim 1, wherein the stop is formed by an engagement element which is movable into engagement with the component part of the locking device.

7. The head rest arrangement according to claim 6, wherein when the head rest is displaced the component part of the locking device is brought into a position where the engagement element is engageable in the component part.

8. The head rest arrangement according to claim 7, wherein the component part of the locking device during displacement of the head rest is movable by an actuating element which is movable during displacement of the head rest into the position where the engagement element is engageable in the component part.

9. The head rest arrangement according to claim 1, wherein during displacement of the head rest the stop is movable into a position in which it acts on the component part of the locking device.

10. The head rest arrangement according to claim 9, wherein the stop is movable by swivel movement into the position where it acts on the component part of the locking device.

11. The head rest arrangement according to claim 9, wherein when the locking device is locked the stop is held in a position in which it does not act on the locking device, and that when the head rest is displaced the stop is released to act on the locking device.

12. The head rest arrangement according to claim 11, further compromising a securing element which is movable when the head rest is displaced and which releases the stop when the head rest is displaced.

13. The head rest arrangement according to claim 1, wherein the stop is pretensioned to a position where it acts on the locking device.

14. The head rest arrangement according to claim 1, wherein the locking device is mounted on the backrest frame.

15. The head rest arrangement according to claim 1, wherein the locking device has a primary locking element which in a locked state of the locking device interacts with a holding element of the head rest so that the head rest is not able to move and which primary locking element is movable by actuation so that it releases the holding element.

16. The head rest arrangement according to claim 15, wherein the holding element during displacement of the head rest is movable relative to the primary locking element after the primary locking element has been actuated to release the holding element.

17. The head rest arrangement according to claim 15, wherein the primary locking element has a locking claw which in the locked state of the locking device engages over the holding element.

18. A locking device according to claim 15, wherein the primary locking element is formed by a swivel mounted locking pawl.

19. The head rest arrangement according to claim 15, wherein the primary locking element is pretensioned by an elastic element in a direction of the unlocked state.

20. The head rest arrangement according to claim 15, wherein
wherein at least one stop is provided which when the locking device is unlocked acts on a component part of the locking device so that the locking device is held in a state defined by the interaction of the stop with the component part,
wherein the stop is formed by an engagement element which is movable into engagement with the component part of the locking device,
wherein when the head rest is displaced the component part of the adjusting device is brought into a position where the engagement element is engageable in the component part,
wherein the component part of the locking device during displacement of the head rest is movable by an actuating element which is movable during displacement of the head rest into the position where the engagement element is engageable in the component part, and
wherein the component part of the locking device is brought through action of the actuating element on the primary locking element into a position in which the engagement element is engageable in the component part.

21. The head rest arrangement according to claim 20, wherein the actuating element functions as the holding element in the locked state.

22. The head rest arrangement according to claim 15, comprising a secondary locking element with which the primary locking element is engageable in a position in which the locking device is locked and which is movable by actuation to unlock the locking device so that it releases the primary locking element.

23. The head rest arrangement according to claim 22, wherein the secondary locking element is formed by a locking lever.

24. The head rest arrangement according to claim 22, wherein the secondary locking element is elastically pretensioned in a direction of a state in which it holds the primary locking element in a position in which the locking device is locked.

25. The head rest arrangement according to claim 22, wherein an elastic pretension of the primary locking element on one side and of the secondary locking element on the other are attuned with each other so that the secondary locking element holds the primary locking element in a position which corresponds to the locked state when the secondary locking element has not been actuated to release the locking device.

26. The head rest arrangement according to claim 22, wherein
at least one stop is provided which when the locking device is unlocked acts on a component part of the locking device so that the locking device is held in a state defined by the interaction of the stop with the component part and wherein the component part of the locking device defines the secondary locking element.

27. The head rest arrangement according to claim 26, wherein the stop acts on the secondary locking element.

28. The head rest arrangement according to claim 22, comprising the unlocking mechanism to unlock the locking device in a crash situation in order to allow displacement of the head rest wherein the unlocking mechanism is coupled to the secondary locking element.

29. The head rest arrangement according to claim 1, further comprising an unlocking mechanism to unlock the locking device in a crash situation in order to allow displacement of the head rest.

30. The head rest arrangement according to claim 29, wherein the unlocking mechanism has for acting on the locking device a tension or push means which is coupled to the locking device.

31. The head rest arrangement according to claim 29, wherein the unlocking mechanism is controllable by a sensor.

32. The head rest arrangement according to claim 29, wherein the unlocking mechanism is controllable electrically and/or mechanically.

33. The head rest arrangement according to claim 32, wherein the unlocking mechanism is controllable by an electromagnet.

34. The head rest arrangement according to claim 1, wherein the control device to keep the locking device in the unlocked state is deactivated by moving the head rest back from a displaced position into its useful position.

35. The head rest arrangement according to claim 34, wherein the control device to keep the locking device in the unlocked state is deactivated automatically as the head rest moves back into its useful position.

36. The head rest arrangement according to claim 34, wherein
at least one stop is provided which when the locking device is unlocked acts on a component part of the locking device so that the locking device is held in a state defined by the interaction of the stop with the component part,
further compromising a securing element which is movable when the head rest is displaced and which releases the stop when the head rest is displaced, wherein the deactivation is implemented through action of the securing element on the locking device.

37. The head rest arrangement according to claim 36, wherein the stop is formed by an engagement element which is movable into engagement with the component part of the locking device, wherein when the head rest is displaced the component part of the adjusting device is brought into a position where the engagement element is engageable in the component part, wherein the component part of the locking device during displacement of the head rest is movable by an actuating element which is movable during displacement of the head rest into the position where the engagement element is engageable in the component part, and wherein the actuating element acts on the locking device so that the engagement element is brought out of engagement with the component part of the locking device.

38. The head rest arrangement according to, claim 37, wherein the locking device is pretensioned by at least one first elastic element in a direction of a locked state and wherein the action of the securing element on the engagement element brings the locking device into the locked state under the pretension of the first elastic element.

* * * * *